(12) United States Patent
Takagi et al.

(10) Patent No.: US 8,101,668 B2
(45) Date of Patent: Jan. 24, 2012

(54) GRAFT POLYMER

(75) Inventors: Shigeharu Takagi, Nishikamo-gun (JP); Mitsuru Higa, Ube (JP)

(73) Assignees: Toyota Jidosha Kabushiki Kaisha, Toyota (JP); Yamaguchi University, Yamaguchi-Shi (JP)

( * ) Notice: Subject to any disclaimer, the term of this patent is extended or adjusted under 35 U.S.C. 154(b) by 509 days.

(21) Appl. No.: 11/886,001

(22) PCT Filed: Mar. 15, 2006

(86) PCT No.: PCT/JP2006/305627
§ 371 (c)(1),
(2), (4) Date: Sep. 10, 2007

(87) PCT Pub. No.: WO2006/098484
PCT Pub. Date: Sep. 21, 2006

(65) Prior Publication Data
US 2008/0176966 A1    Jul. 24, 2008

(30) Foreign Application Priority Data
Mar. 16, 2005 (JP) ................. 2005-075790
Sep. 2, 2005 (JP) ................. 2005-254861

(51) Int. Cl.
C08J 5/22 (2006.01)
C08F 261/04 (2006.01)
C08F 261/00 (2006.01)
C08L 51/00 (2006.01)

(52) U.S. Cl. ............. 521/27; 525/535; 525/59; 525/419

(58) Field of Classification Search ............... 521/27; 525/535, 59, 419
See application file for complete search history.

(56) References Cited

U.S. PATENT DOCUMENTS

| | | | |
|---|---|---|---|
| 3,962,398 A | | 6/1976 | Matsuo et al. |
| 5,340,874 A | * | 8/1994 | Famili et al. ............... 525/59 |
| 6,001,903 A | * | 12/1999 | Nakamae et al. ............ 524/3 |
| 6,623,576 B2 | * | 9/2003 | Mitchell et al. ........... 156/62.2 |
| 2005/0175879 A1 | * | 8/2005 | Kiefer et al. ............... 429/33 |

FOREIGN PATENT DOCUMENTS

| | | |
|---|---|---|
| EP | 0 057 065 A2 | 8/1982 |
| EP | 0 633 275 A1 | 1/1995 |

(Continued)

OTHER PUBLICATIONS

Hamaya et al., "Novel Proton-conducting Polymer Electrolite Membrane Prepared by Chemical Crosslinking of PVA/PAMPS/PEG Blend," The 45$^{th}$ Battery Symposium in Japan, Abstract 676-677, Nov. 27, 2004.

*Primary Examiner* — Michael M Bernshteyn
(74) *Attorney, Agent, or Firm* — Oliff & Berridge, PLC

(57) ABSTRACT

This invention provides a novel graft polymer that has excellent proton conductivity, is capable of regulating hydrogen permeability, methanol permeability, and the like, and can serve as a starting material for a polymer electrolyte membrane, which facilitates moisture balance control and efficient operation of a fuel cell. A polymer electrolyte membrane composed of such graft polymer is also provided. This graft polymer comprises a main chain comprising a hydroxyl group-containing polymer and a graft chain comprising a polymer containing a sulfonic acid group-containing monomer.

26 Claims, 6 Drawing Sheets

FOREIGN PATENT DOCUMENTS

| | | | |
|---|---|---|---|
| EP | 633275 A1 * | 1/1995 |
| EP | 0 765 885 A1 | 4/1997 |
| EP | 765885 A1 * | 4/1997 |
| EP | 1 038 903 A1 | 9/2000 |
| EP | 1038903 A1 * | 9/2000 |
| JP | A 57-036110 | 2/1982 |
| JP | A 57-187002 | 11/1982 |
| JP | A 05-283094 | 10/1993 |
| JP | A 2001-213987 | 8/2001 |
| JP | 2004-158270 | 6/2004 |
| JP | 2004-253336 | 9/2004 |
| JP | 2004-335119 | 11/2004 |
| WO | WO 01/58576 A1 | 8/2001 |
| WO | WO 03/096464 A2 | 11/2003 |
| WO | WO 03096464 A2 * | 11/2003 |
| WO | WO 2005/051899 A2 | 6/2005 |

* cited by examiner (*1: the value in relation to hydrogen permeability of Nafion 117)

GRAFT POLYMER

TECHNICAL FIELD

The present invention relates to a novel graft polymer, a polymer electrolyte membrane, a method for producing the same, and a fuel cell using the same.

BACKGROUND ART

Nafion® (DuPont) or the like, which is a copolymer composed of a hydrophobic segment and an ion-conductive segment, has been heretofore known as a polymer electrolyte for a polymer electrolyte fuel cell. Such polymer has been utilized in the form of a membrane prepared via a membrane-forming technique such as casting.

When such polymer electrolyte membrane is used, moisture supply, such as moistening of an electrolyte membrane or an electrode, is necessary to realize efficient operation of the polymer electrolyte fuel cell. Because of such necessity, conventional polymer electrolyte fuel cells were required to be equipped with complicated piping systems, such as a moisture-supplying system using a pump, blower, or the like and a system for regulating the gas temperature or flow rate to allow the diffusion of the generated moisture, a drive system, and a control system. Such requirement not only inhibits a reduction in the sizes and weights of polymer electrolyte fuel cells, which is a primary advantage of fuel cells, but also involves various difficulties such as the necessity of external energy supply upon diffusion of the generated water, in the case of a low-temperature fuel cell.

JP Patent Publication (Unexamined) No. 5-283094 (1993) discloses a polymer electrolyte membrane comprising a mixture of, for example, Nafion® (DuPont) and polyvinyl alcohol having a hydrophilic segment. In such electrolyte-based fuel cell, an air electrode is allowed to couple to a fuel electrode via a water-absorbing or water-retentive material, such as polyvinyl alcohol. The moisture generated on the air electrode side and the moisture that has migrated from the fuel electrode side to the air electrode side in the fuel cell are collected, and the collected moisture is allowed to migrate to the fuel electrode side via the aforementioned water-absorbing or water-retentive material by the force of surface tension, thereby supplying moisture that is necessary for the fuel electrode. This constitution permits the fuel cells to work without complicated moisture control, eliminates the need for a system for moistening and for water supply, and realizes a reduction in the sizes of fuel cells.

The Proceedings of the 45$^{th}$ Battery Symposium in Japan, Abstract 676-677, 2004 discloses an electrolyte membrane that is produced by mixing aqueous solutions of polyvinyl alcohol (PVA), of 2-acrylamido-2-methylpropane sulfonic acid (AMPS), and of polyethylene glycol (PEG) at a given mixing ratio, agitating the resulting mixture, and spreading the mixture on a teflon sheet or the like for casting. This document also discloses a crosslinked membrane, which is produced by allowing this PVA-AMPS-PEG mixture to react with a solution of glutaraldehyde in acetone or the like for a given period of time.

DISCLOSURE OF THE INVENTION

According to the disclosure of JP Patent Publication (Unexamined) No. 5-283094 (1993), the resulting polymer electrolyte membrane is macroscopically nonuniform and thus has insufficient proton conductivity.

The PVA/AMPS/PEG crosslinked membrane disclosed in The Proceedings of the 45$^{th}$ Battery Symposium in Japan, Abstract 676-677, 2004 had insufficient proton conductivity. Also, glutaraldehyde is mainly crosslinked with a hydroxyl group of PVA but hardly crosslinked with AMPS. Thus, performance of such membrane is insufficient since hydrogen permeability, methanol permeability, and the like of such membrane cannot be sufficiently controlled. Due to insufficient crosslinking, membrane components disadvantageously leak, and performance of the membrane cannot be maintained.

It is an object of the present invention to provide a novel graft polymer, which has excellent proton conductivity, can regulate hydrogen permeability, methanol permeability, and the like, and can serve as a starting material of a polymer electrolyte membrane, which facilitates moisture balance control and efficient operation of a fuel cell. It is another object of the present invention to provide a polymer electrolyte membrane composed of such graft polymer.

The present inventors have conducted concentrated studies in order to attain the above objects. As a result, they found that the above objects could be attained via development of a graft polymer composed of a combination of a specific main and side chains. They also found that a polymer electrolyte membrane composed of such graft polymer has excellent proton conductivity, can regulate hydrogen permeability, methanol permeability, and the like, and is substantially macroscopically uniform. Thus, moisture can be automatically evenly circulated inside the membrane, and such membrane exhibits excellent proton conductivity in high temperature and low moisture environments. This has led to the completion of the present invention.

Specifically, the first aspect of the present invention concerns a graft polymer having a novel structure, which comprises a main chain comprising a hydroxyl group-containing polymer and a graft chain containing a sulfonic acid group-containing monomer.

Various types of polymers are used as polymers containing hydroxyl groups as described below. A particularly preferable example thereof is polyvinyl alcohol (PVA).

Various types of monomers are used as sulfonic acid group-containing monomers as described below. Particularly preferable examples thereof include 2-acrylamido-2-methylpropane sulfonic acid (AMPS), 2-(meth)acrylamido-2-methylpropane sulfonic acid (AMPS), and salts thereof. 2-Acrylamido-2-methylpropane sulfonic acid (AMPS) is a monomer represented by the following chemical formula.

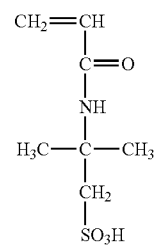

The ratio of a main chain comprising a hydroxyl group-containing polymer to a graft chain comprising a polymer containing a sulfonic acid group-containing monomer in the graft polymer of the present invention is not limited. The main chain comprising a polymer can be synthesized with the graft chain comprising a polymer at a wide range of mixing ratios. The present invention also includes a graft polymer comprising a sulfonic acid group-containing monomer in amounts of 1 to 90 mole percent relative to the entire graft polymer.

When the graft polymer of the present invention is used for an electrolyte membrane of a polymer electrolyte fuel cell, for example, the content of a sulfonic acid group-containing monomer is preferably 2 to 20 mole percent, more preferably 6 to 20 mole percent, and further preferably 6 to 10 mole percent, relative to the entire graft polymer for the following reasons. When such content is less than 2 mole percent, proton conductivity required for a fuel cell cannot be satisfactorily exhibited. When such content exceeds 60 mole percent, the resulting graft polymer becomes fragile, and the mechanical strength of the membrane becomes poor.

When the graft polymer of the present invention is used for other applications, the graft polymer may comprise the main chain and the side chain at various ratios. When the graft polymer is used for a humidity sensor, for example, the graft chain content may be higher.

Preferably, the graft polymer of the present invention is subjected to physical and/or chemical crosslinking following synthesis or following synthesis and membrane formation. Via such crosslinking, a main chain comprising a hydrophilic hydroxyl group-containing polymer becomes water-insoluble. Such crosslinking can suppress swelling of the membrane in an aqueous environment, can impart superior dimensional stability to the membrane, and can improve the mechanical strength of the membrane.

Crosslinking may be carried out physically or chemically. In the present invention, either or both thereof may be carried out.

Physical crosslinking is preferably carried out via thermal treatment. Upon thermal treatment, a domain or point of crystallization is generated where main chains composed of hydroxyl group-containing polymers are intensively oriented, and these main chains are physically crosslinked with one another. Thermal treatment is preferably carried out at 100° C. to 200° C., and more preferably at 140° C. to 180° C. When thermal treatment is carried out at a temperature close to the oxidation temperature for hydroxyl group-containing polymers, i.e., at around 200° C., it is preferably carried out in an inert gas atmosphere. In such a case, a sulfonic acid group is preferably converted to a sodium form to prevent polymer oxidation.

A preferable example of chemical crosslinking is that carried out with glutaraldehyde (GA). A hydroxyl group-containing polymer, such as polyvinyl alcohol (PVA), is crosslinked with the aid of glutaraldehyde (GA) in a manner represented by the following formula:

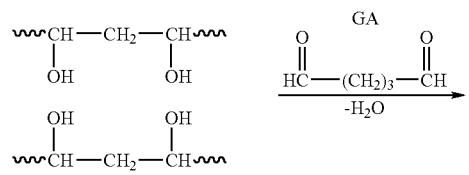
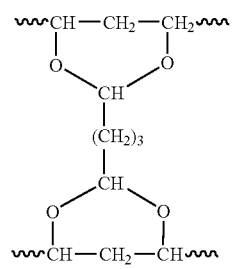

The second aspect of the present invention concerns a method for producing the aforementioned graft polymer comprising subjecting a hydroxyl group-containing polymer to graft polymerization with a sulfonic acid group-containing monomer.

As mentioned above, a preferable example of a hydroxyl group-containing polymer is polyvinyl alcohol (PVA). Preferable examples of a sulfonic acid group-containing monomer include 2-acrylamido-2-methylpropane sulfonic acid (AMPS), 2-(meth)acrylamido-2-methylpropane sulfonic acid (AMPS), and salts thereof.

The content of sulfonic acid group-containing monomers is as described above.

Polymerization is carried out using various types of polymerization initiators in a water-soluble medium as described below. Examples of preferable polymerization initiators include tetravalent Ce, trivalent Ag, trivalent Cu, tetravalent Ni, and diammonium cerium nitrate (CAN). Use of diammonium cerium nitrate (CAN) as a polymerization initiator results in reduction of a 4-serium ion to a 3-valent ion, extraction of a hydrogen ion from carbon atoms in a hydroxyl group-containing polymer, and generation of a radical, as shown in the following chemical formula. Radical polymerization is then initiated from the resulting radical.

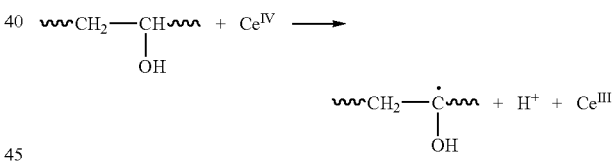

The third aspect of the present invention concerns a polymer electrolyte membrane comprising the graft polymer.

The polymer electrolyte membrane comprising the graft polymer of the present invention is formed via various conventional techniques. An example of a preferable membrane formation technique is casting of a graft polymer.

Preferably, the polymer electrolyte membrane of the present invention is subjected to physical and/or chemical crosslinking following synthesis of the graft polymer or following membrane formation. Via such crosslinking, a main chain comprising a hydrophilic hydroxyl group-containing polymer becomes water-insoluble. Such crosslinking can suppress swelling of the membrane in an aqueous environment, can impart superior dimensional stability to the membrane, and can improve mechanical strength of the membrane.

Crosslinking may be carried out physically or chemically. In the present invention, either or both thereof may be carried out. Physical crosslinking is preferably carried out via thermal treatment. A preferable example of chemical crosslinking is that mediated by glutaraldehyde (GA).

The fourth aspect of the present invention concerns a method for producing a polymer electrolyte membrane comprising the graft polymer comprising a step of synthesizing the graft polymer and a step of casting the graft polymer.

Preferably, the method further comprises a step of subjecting the graft polymer to physical and/or chemical crosslinking as described above.

In the present invention, a step of casting may be carried out on a planar object, or it may be carried out by impregnating a graft polymer into a porous polymer.

The water-soluble polymer electrolyte membrane of the present invention is preferably insolubilized following the step of casting. Specific examples of methods for insolubilization include a method wherein a graft polymer-containing solution is insolubilized using an organic solvent such as acetone and a method wherein a graft polymer-containing solution is insolubilized using a salt such as sodium chloride.

The fifth aspect of the present invention concerns a polymer electrolyte fuel cell comprising the polymer electrolyte membrane.

The graft polymer comprising a main chain comprising a hydroxyl group-containing polymer and a graft chain comprising a polymer containing a sulfonic acid group-containing monomer of the present invention has excellent proton conductivity, can regulate hydrogen permeability, methanol permeability, and the like, and can serve as a starting material for a polymer electrolyte membrane, which facilitates moisture balance control and efficient operation of a fuel cell.

PREFERRED EMBODIMENTS OF THE INVENTION

Figure 1:
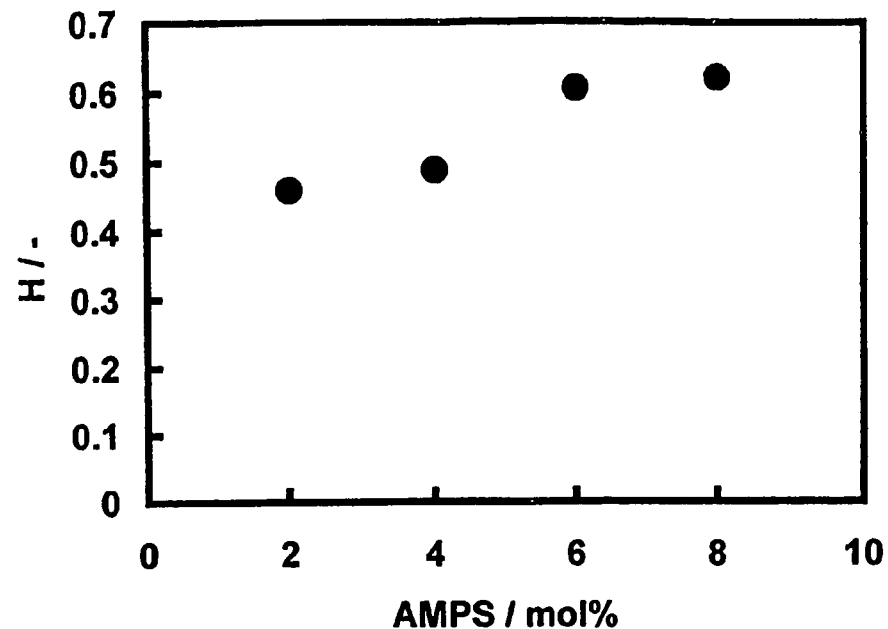
FIG. 1 is a graph showing the correlation between AMPS content and hydrous content H.

In the present invention, a main chain comprising a hydroxyl group-containing polymer is not particularly limited. Specific examples of preferable polymers include: vinyl alcohol resins represented by polyvinyl alcohol (PVA), a saponification product of an ethylene-vinyl acetate copolymer, and poly-α-hydroxy vinyl alcohol; cellulose derivatives represented by carboxymethylcellulose; hydroxyl-containing polyacrylic resins represented by polyhydroxylethylmethacrylate and polyhydroxyethyl methyl acrylate; and hydroxyl-containing polystyrene resins represented by parahydroxypolystyrene.

In the present invention, a sulfonic acid group-containing monomer that constitutes a graft chain is not particularly limited. Specific examples of preferable monomers include 2-acrylamido-2-methylpropane sulfonic acid (AMPS), 2-(meth)acrylamido-2-methylpropane sulfonic acid (AMPS), vinyl sulfonic acid, styrene sulfonic acid, α-methyl styrene sulfonic acid, 2-sulfoethyl methacrylate, and salts thereof.

The aforementioned sulfonic acid group-containing monomer can constitute a graft chain via copolymerization with other vinyl monomers. Other vinyl monomers to be copolymerized are not particularly limited, and those with high copolymerizability are selected. Specific examples of such monomers include, but are not limited to: acrylic monomers such as acrylic acid, glycidyl methacrylate, acrylonitrile, acrylic acid ester, and methacrylic acid ester; styrene monomers such as styrene and chloromethylstyrene; and diene compounds such as divinylbenzene. Examples of such monomers further include α-olefins, such as ethylene, propylene, butene-1, pentene-1, hexene-1, 4-methyl-pentene-1, and octene-1, vinyl chloride, vinyl acetate, vinyl ethers, vinylcarbazole, and acrylonitrile. A vinylidene compound containing a vinylidene group is also copolymerizable. Examples thereof include vinylidene chloride, vinylidene fluoride, and isobutyrene. Further, compounds having a carbon-carbon double bond other than a vinyl monomer and a vinylidene compound are also copolymerizable. Examples thereof include maleic anhydride, pyromellitic dianhydride, 2-butenoic acid, polytetrafluoroethylene, polychlorotrifluoroethylene, and compounds containing 2 or more double bonds, such as butadiene, isoprene, and chloroprene.

In the present invention, grafting is preferably carried out (1) in the presence of a catalyst or reaction initiator (hereafter referred to as an "initiator"), (2) via heating in the presence or absence of an initiator, or (3) via ultraviolet irradiation in the presence or absence of a catalyst or initiator.

Examples of an initiator include: peroxides, such as benzoyl peroxide, t-butyl hydroxyperoxide, and di-t-butyl hydroxyperoxide; diammonium cerium nitrate (IV); persulfates, such as potassium persulfate and ammonium persulfate; oxidation-reduction initiators, such as a combination of an oxidizing agent, such as persulfate, hydrogen peroxide, or hydroperoxide with an inorganic reduction agent, such as copper salt, iron salt, sodium bisulfite, or sodium thiosulfate or an organic reduction agent, such as alcohol, amine, or oxalic acid, and a combination of an oxidizing agent, such as hydroperoxide with an inorganic reduction agent, such as copper salt, iron salt, sodium bisulfite, or sodium thiosulfate, an organic reduction agent, such as dialkyl peroxide or diacyl peroxide, or a reduction agent, such as tertiary amine, naphthenate, mercaptan, or an organometallic compound (e.g., triethyl aluminum or boron triethyl); and other known radical polymerization initiators. A water-soluble polymerization initiator, such as diammonium cerium nitrate (IV) or potassium peroxide, is particularly preferably used, and a water-insoluble initiator, such as benzoyl peroxide or N,N-azobisisobutyronitrile, can be dissolved in methanol or acetone and then mixed with water. In the case of ultraviolet irradiation, a photosensitizer, such as benzophenone or hydrogen peroxide, may be used as a catalyst in addition to a polymerization initiator.

Grafting can be carried out by a general technique. Specific examples are as follows. In the case of a water-soluble initiator, a required amount thereof is dissolved in water. In the case of a water-insoluble initiator, the initiator is first dissolved in an organic solvent that is miscible with water, such as alcohol or acetone (e.g., acetone or methanol), and the resulting solution is then mixed with water to prevent the precipitation of the initiator. A main chain comprising a hydroxyl group-containing polymer is introduced into a solution of initiator, and a sulfonic acid group-containing monomer is added to carry out grafting. The atmosphere inside the reaction vessel is substituted with nitrogen according to need. When thermal grafting is carried out, the reaction mixture is heated at an adequate temperature for an adequate period of time. When grafting is carried out with ultraviolet irradiation, irradiation is carried out at an adequate temperature for an adequate period of time.

In the present invention, the method of membrane formation is not particularly limited, and any conventional technique can be employed. A preferable example thereof is a method wherein a membrane is formed by casting a graft polymer.

In membrane formation via casting, a graft polymer may be dissolved in a solvent and then cast.

Any solvent can be used for membrane formation as long as it can dissolve the polymer electrolyte of the present invention and then remove the same. Examples thereof include: polar aprotic solvents, such as N,N-dimethylformamide, N,N-dimethylacetamide, N-methyl-2-pyrrolidone, and dimethyl sulfoxide; chlorinated solvents, such as dichloromethane, chloroform, 1,2-dichloroethane, chlorobenzene, and dichlorobenzene; alcohols, such as methanol, ethanol, and propanol; alkylene glycol monoalkyl ethers, such as ethylene glycol monomethyl ether, ethylene glycol monoethyl ether, propylene glycol monomethyl ether, and propylene glycol monoethyl ether; and water. These solvents may be used singly or in combinations of two or more according to need. Dimethylformamide, dimethylacetamide, N-methylpyrrolidone, and dimethyl sulfoxide are particularly preferable in terms of high capacity for dissolving polymers.

The polymer electrolyte membrane of the present invention may be laminated with a support membrane, i.e., a porous membrane. The porous membrane serves as a matrix for impregnating the polymer electrolyte, and such membrane is used for improving the strength, flexibility, and durability of the polymer electrolyte.

Any porous membrane can be used regardless of its configuration or material as long as the aforementioned conditions are satisfied. When a porous membrane is used as a permeable membrane of the polymer electrolyte fuel cell, the porous membrane has a thickness of 1 to 100 µm, preferably 3 to 30 µm, and more preferably 5 to 20 µm, a pore diameter of 0.01 to 10 µm, and preferably 0.02 to 7 µm, and a porosity of 20% to 98%, and preferably 30% to 95%.

When the porous membrane is excessively thin, the effects of strength reinforcement after lamination or the effects of flexibility or durability impartation become insufficient, which is likely to cause gas leakage (cross leakage). In contrast, an excessively thick porous membrane disadvantageously results in elevated electric resistance, and the resulting laminate is unfavorable as a permeable membrane of the polymer electrolyte fuel cell. An excessively small pore diameter renders impregnation with a polymer electrolyte very difficult, and an excessively large pore diameter results in attenuated strength reinforcement effects of the polymer electrolyte. When the porosity is too small, resistance as a polymer electrolyte membrane is elevated. When the porosity is too large, the strength of the porous membrane is generally deteriorated and the effects of reinforcement cannot be attained.

The material of the porous membrane is preferably an aliphatic polymer or a fluorine-containing polymer in view of heat resistance and the effects of physical strength reinforcement.

Examples of aliphatic polymers include, but are not limited to, polyethylene, polypropylene, and an ethylene-propylene copolymer. Polyethylene is an ethylene-based polymer having a crystal structure of polyethylene. Examples thereof include a copolymer of ethylene and another monomer, and specific examples thereof include an ethylene-α-olefin copolymer that is referred to as a linear low-density polyethylene (LLDPE) and an ultra-high molecular weight polyethylene. The term "polypropylene" used herein refers to a propylene polymer having a crystal structure of polypropylene, and it includes propylene block and random copolymers with ethylene, 1-butene, or the like that are commonly used.

The term "fluorine-containing polymer" refers to any conventional thermoplastic resin having at least 1 carbon-fluorine bond in its molecule. In general, a fluorine-containing polymer modified from an aliphatic polymer by substitution of all or most hydrogen atoms with fluorine atoms is preferably used.

Examples of fluorine-containing polymers that can be preferably used include, but are not limited to, polytrifluoroethylene, polytetrafluoroethylene, polychlorotrifluoroethylene, poly(tetrafluoroethylene-hexafluoropropylene), poly(tetrafluoroethylene-perfluoroalkylether), and polyvinylidene fluoride. In the present invention, polytetrafluoroethylene and poly(tetrafluoroethylene-hexafluoropropylene) are preferable, and polytetrafluoroethylene is particularly preferable. Such fluorine resins preferably have average molecular weights of 100,000 or higher from the viewpoint of satisfactory mechanical strength.

Methods of laminating the polymer electrolyte membrane of the present invention with a porous membrane are not particularly limited. Examples of such methods include, but are not limited to: a method wherein a porous membrane is immersed in a polymer electrolyte solution, the porous membrane is removed therefrom, and a solvent is then dehydrated for lamination; a method wherein a polymer electrolyte solution is used to coat a porous membrane, and a solvent is then dehydrated for lamination; and a method wherein a porous membrane is brought into contact with a polymer electrolyte solution under reduced pressure, the membrane is brought back to atmospheric pressure conditions to allow the solution to impregnate pores of the porous membrane, and the solvent is then dehydrated for lamination.

The polymer electrolyte membrane of the present invention can comprise common additives, i.e., a stabilizer such as an antioxidant and a release agent.

The thickness of the polymer electrolyte membrane of the present invention is not particularly limited, and it is preferably 10 µm to 200 µm. The thickness is preferably greater than 10 µm to realize a membrane strength that can be satisfactorily put to practical use. From the viewpoint of a reduction in membrane resistance, i.e., an improvement in power generating capacity, the thickness is preferably smaller than 200 µm, and it is more preferably smaller than 100 µm. The thickness of the membrane can be regulated by solution concentration or substrate coating thickness.

Hereafter, the fuel cell of the present invention is described.

The fuel cell of the present invention can be produced by binding a catalyst and a conductive material as a charge collector onto the both surfaces of the polymer electrolyte membrane.

Any conventional catalyst can be used without particular limitations as long as it can activate an oxidation-reduction reaction with hydrogen or oxygen, and use of fine platinum particles is preferable. Fine platinum particles are preferably carried on particulate or fibrous carbon, such as active carbon or graphite.

Conventional conductive materials as charge collectors can be employed. A porous carbon nonwoven fabric or porous carbon paper is preferable for effective transportation of gas as a starting material to the catalyst.

A method of binding fine platinum particles or carbon carrying fine platinum particles to a porous carbon nonwoven fabric or porous carbon paper and a method of binding such catalyst to a polymer electrolyte membrane can be carried out in accordance with a wide variety of conventional techniques.

The fuel cell of the present invention thus produced can be used in various forms that involve the use of hydrogen gas, modified hydrogen gas, or methanol as a fuel.

EXAMPLES

Hereafter, examples and comparative examples of the present invention are described.

In the present invention, the following parameter was employed to represent the properties of the electrolyte membrane: $\phi=\sigma/P$. The symbol "$\sigma$" represents the proton conductivity of the electrolyte (s/cm) and the symbol "P" represents a methanol permeation coefficient ($m^2/s$). A lower methanol permeation coefficient is preferable for a fuel cell that uses methanol as a fuel gas, permeability of hydrogen gas can be deduced therefrom, and thus, such a low methanol permeation coefficient can be used as an indicator for representing the degree of suitability for a fuel cell that uses hydrogen gas as a fuel gas. Specifically, the greater the parameter "$\phi$," the better the performance of the fuel cell. Nafion 117 has $\phi$ of approximately 8,000.

Example 1

(1) Polyvinyl alcohol (PVA, 2 g) and a 2-acrylamido-2-methylpropane sulfonic acid (AMPS) monomer (12 g) were dissolved in 60 ml of ion-exchanged water.

(2) After nitrogen gas was bubbled for 60 minutes, 0.115 g of diammonium cerium nitrate (CAN) was added as a polymerization initiator, and polymerization was carried out at 40° C. for 15 hours together with agitation with a stirrer.

(3) The composition of the graft polymer was analyzed via NMR, and the AMPS content was found to be 29.1 mole percent.

(4) The graft polymer was mixed with PVA to bring the AMPS content to 8 mole percent, the resultant was dissolved in 30 ml of ion-exchanged water, and the solution was then cast on an acrylic board to form a membrane.

(5) The formed membrane was thermally treated at 120° C. for 20 minutes.

(6) The membrane was immersed in an aqueous solution of 0.05 volume percent glutaraldehyde for 24 hours.

(7) Based on the dry and wet weights of the membrane, the hydrous content (H) was determined. The results are shown in FIG. 1.

Figure 2:
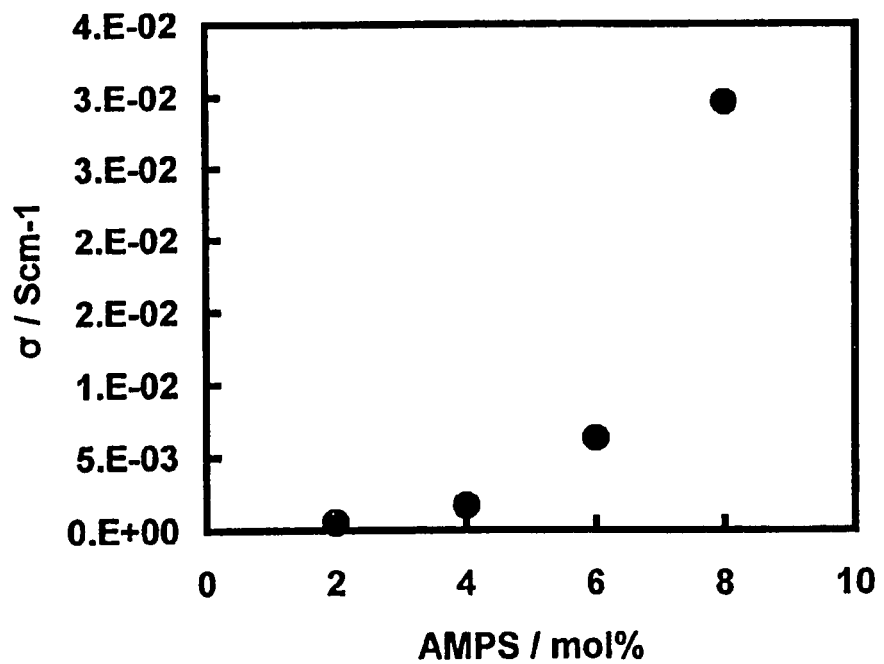
FIG. 2 is a graph showing the correlation between AMPS content and proton conductivity σ.

(8) The alternating current impedance was measured in pure water at 25° C. to determine the proton conductivity $\sigma$. The results are shown in FIG. 2.

Figure 3:
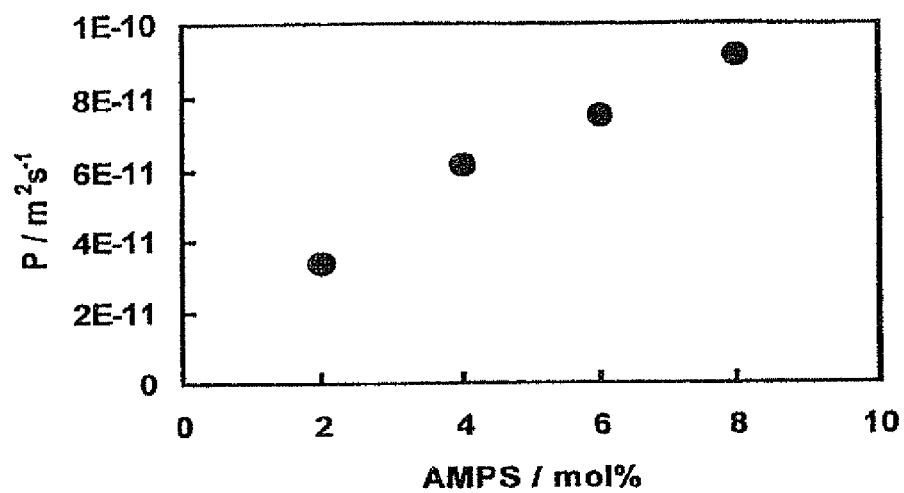
FIG. 3 is a graph showing the correlation between AMPS content and methanol permeability P.

(9) The membrane was sandwiched between 2 cells at 25° C., an aqueous solution of 2 mol/l methanol was introduced into one side of the membrane, ion-exchanged water was introduced into the opposite side, and changes in the methanol concentration on the ion-exchanged water side was measured via gas chromatography with the elapse of time to determine the methanol permeation coefficient P. The results are shown in FIG. 3.

Figure 4:
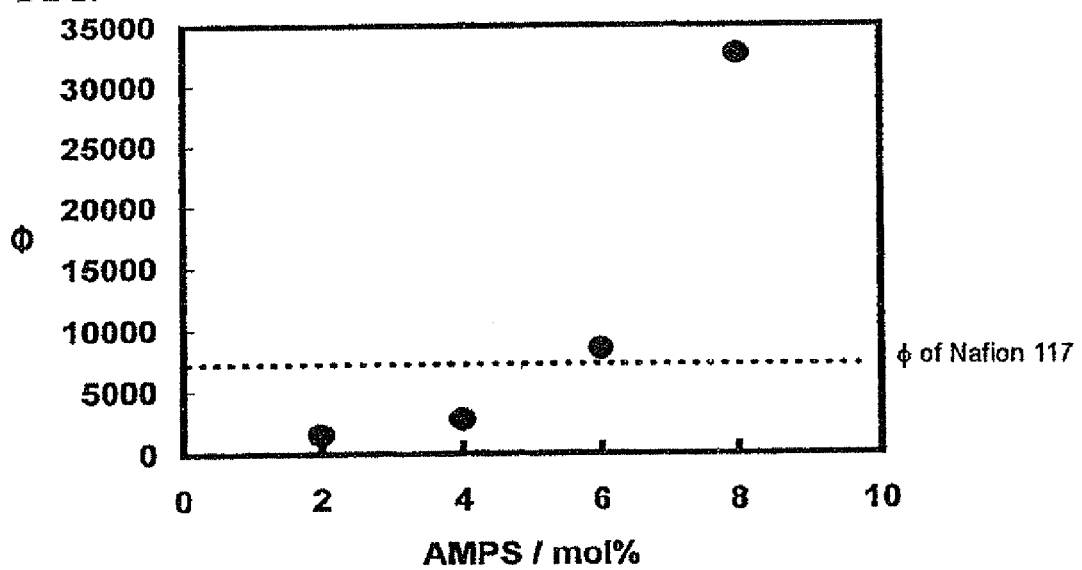
FIG. 4 is a graph showing the correlation between AMPS content and parameter φ.

(10) The parameter $\phi=\sigma/P$ was calculated as a property value of the membrane. The results are shown in FIG. 4.

Example 2

The procedures of Example 1 were repeated except for (4).

(4) The graft polymer was mixed with PVA to bring the AMPS content to 6 mole percent, the resultant was dissolved in 30 ml of ion-exchanged water, and the solution was then cast on an acrylic board to form a membrane.

Example 3

The procedures of Example 1 were repeated except for (4).

(4) The graft polymer was mixed with PVA to bring the AMPS content to 4 mole percent, the resultant was dissolved in 30 ml of ion-exchanged water, and the solution was then cast on an acrylic board to form a membrane.

Example 4

The procedures of Example 1 were repeated except for (4).

(4) The graft polymer was mixed with PVA to bring the AMPS content to 2 mole percent, the resultant was dissolved in 30 ml of ion-exchanged water, and the solution was then cast on an acrylic board to form a membrane.

Comparative Example 1

(1) Nafion 117 was evaluated in terms of (8) to (10) of the Examples.

Based on the results shown in FIG. 1 to FIG. 4, the following was found.

a) The methanol permeation coefficients "P" of the membranes prepared in all the examples having AMPS contents of 8 mole percent or lower were better than that of Nafion 117. The methanol permeation coefficient P of Nafion 117 was $3.3\times10^{-10}$.

b) The parameters $\phi$ of the membranes with AMPS contents of 6 mole percent or higher were better than that of Nafion 117.

Based on a) and b), the performance of the electrolyte membrane of the present invention was found to be good, particularly when the AMPS content was 6 mole percent or higher.

Example 5

(1) Polyvinyl alcohol (PVA, 15 g) and a 2-acrylamido-2-methylpropane sulfonic acid (AMPS) monomer (24 g) were dissolved in 225 ml of ion-exchanged water.

(2) After nitrogen gas was bubbled for 60 minutes, 0.855 g of diammonium cerium nitrate (CAN) was added as a polymerization initiator, and polymerization was carried out at 40° C. for 1.5 hours together with agitation with a stirrer.

(3) The composition of the graft polymer was analyzed via NMR, and the AMPS content was found to be 4.3 mole percent.

(4) The graft polymer was dissolved in 30 ml of ion-exchanged water, and the solution was then cast on an acrylic board, followed by drying at 50° C. for 24 hours to form a membrane.

(5) The formed membrane was thermally treated at 120° C. for 20 minutes.

(6) The thermally-treated membrane was immersed in an aqueous solution comprising 10 ml of ion-exchanged water, 1.73 ml of concentrated hydrochloric acid, and glutaraldehyde (GA) in 188 ml of acetone, followed by agitation at 25° C. for 24 hours.

(7) Based on the dry and wet weights of the membrane, the hydrous content (H) was determined.

(8) The alternating current impedance was measured in pure water at 25° C. to determine the proton conductivity σ.

(9) The membrane was sandwiched between 2 cells at 25° C., an aqueous solution of 2 mol/l methanol was introduced into one side of the membrane, ion-exchanged water was introduced into the opposite side, and changes in the methanol concentration on the ion-exchanged water side were measured via gas chromatography with the elapse of time to determine the methanol permeation coefficient P.

Figure 5:
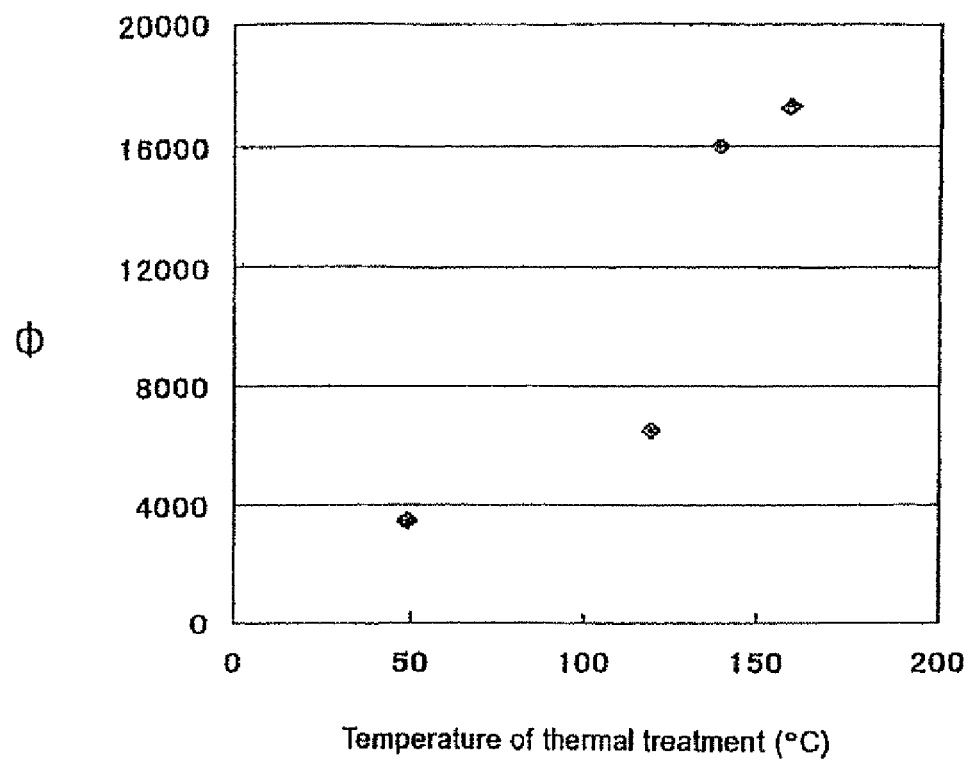
FIG. 5 is a graph showing the correlation between the temperature of thermal treatment and parameter φ.

(10) The parameter φ=σ/P was calculated as a property value of the membrane. The results are shown in FIG. 5.

Example 6

The procedures of Example 5 were repeated except for (5).
(5) The formed membrane was thermally treated at 140° C. for 20 minutes.

Example 7

The procedures of Example 5 were repeated except for (5).
(5) The formed membrane was thermally treated at 160° C. for 20 minutes.

Comparative Example 2

The procedures of Example 5 were repeated except for (5).
(5) Thermal treatment was not carried out.

As is apparent from the results shown in FIG. 5, the parameter φ is improved via thermal treatment. The temperature range of 140° C. to 180° C. is found to be particularly preferable.

Proton conductivity, hydrogen permeability, and membrane strength were evaluated in relation to AMPS content.

Example 8

(1) Polyvinyl alcohol (PVA, 10 g) was dissolved in 150 ml of ion-exchanged water in a conical flask in an oil bath at 100° C.

(2) The mixture was cooled to room temperature, and 25 g of 2-acrylamido-2-methylpropane sulfonic acid (AMPS) monomer was added thereto.

(3) The flask was stoppered with a septum and nitrogen gas was bubbled for 1 hour.

(4) Diammonium cerium nitrate (CAN, 0.570 g) was added as a polymerization initiator, and polymerization was carried out at 40° C. for 1.5 hours together with agitation with a stirrer.

(5) The polymer was allowed to precipitate from a polymerization solution using methanol, followed by filtration and drying.

(6) The resulting polymer (7.4 g) was dissolved in 350 ml of ion-exchanged water at 100° C., and the resulting solution was cast on an acrylic board and then dried at 50° C. to form a membrane.

(7) The composition of the graft polymer was analyzed via NMR, and the AMPS content was found to be 12.8 mole percent.

(8) The alternating current impedance was measured at an RH of 70% at 80° C. to determine the proton conductivity.

(9) The hydrogen permeability of the membrane was evaluated at an RH of 90% at 80° C.

(10) The tensile test was carried out at room temperature, and tensile strength was determined based on the maximal value.

Example 9

The procedures of Example 8 were repeated except for (1), (2), (4), and (7).

(1) Polyvinyl alcohol (PVA, 15 g) was dissolved in 225 ml of ion-exchanged water in a conical flask in an oil bath at 100° C.

(2) The mixture was cooled to room temperature, and 30 g of 2-acrylamido-2-methylpropane sulfonic acid (AMPS) monomer was added thereto.

(4) Diammonium cerium nitrate (CAN, 0.855 g) was added as a polymerization initiator, and polymerization was carried out at 40° C. for 1.5 hours together with agitation with a stirrer.

(7) The composition of the graft polymer was analyzed via NMR, and the AMPS content was found to be 8.5 mole percent.

Example 10

The procedures of Example 8 were repeated except for (1), (2), (4), and (7).

(1) Polyvinyl alcohol (PVA, 15 g) was dissolved in 225 ml of ion-exchanged water in a conical flask in an oil bath at 100° C.

(2) The mixture was cooled to room temperature, and 19 g of 2-acrylamido-2-methylpropane sulfonic acid (AMPS) monomer was added thereto.

(4) Diammonium cerium nitrate (CAN, 0.855 g) was added as a polymerization initiator, and polymerization was carried out at 40° C. for 15 hours together with agitation with a stirrer.

(7) The composition of the graft polymer was analyzed via NMR, and the AMPS content was found to be 2.5 mole percent.

Example 11

The procedures of Example 8 were repeated except for (1), (2), (4), and (7).

(1) Polyvinyl alcohol (PVA, 15 g) was dissolved in 225 ml of ion-exchanged water in a conical flask in an oil bath at 100° C.

(2) The mixture was cooled to room temperature, and 24 g of 2-acrylamido-2-methylpropane sulfonic acid (AMPS) monomer was added thereto.

(4) Diammonium cerium nitrate (CAN, 0.855 g) was added as a polymerization initiator, and polymerization was carried out at 40° C. for 1.5 hours together with agitation with a stirrer.

(7) The composition of the graft polymer was analyzed via NMR, and the AMPS content was found to be 1.4 mole percent.

Figure 6:
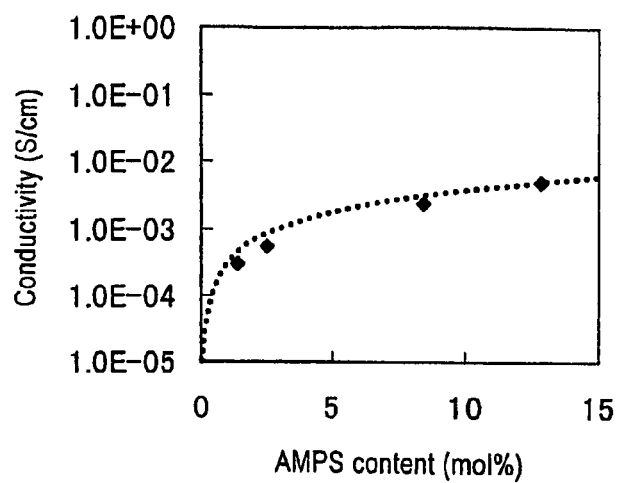
FIG. 6 is a graph showing the correlation between AMPS content and proton conductivity.
Figure 7:
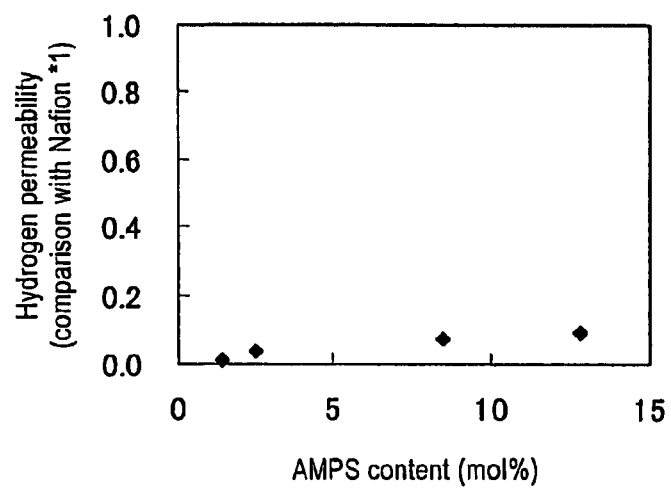
FIG. 7 is a graph showing the correlation between AMPS content and hydrogen permeability.
Figure 8:
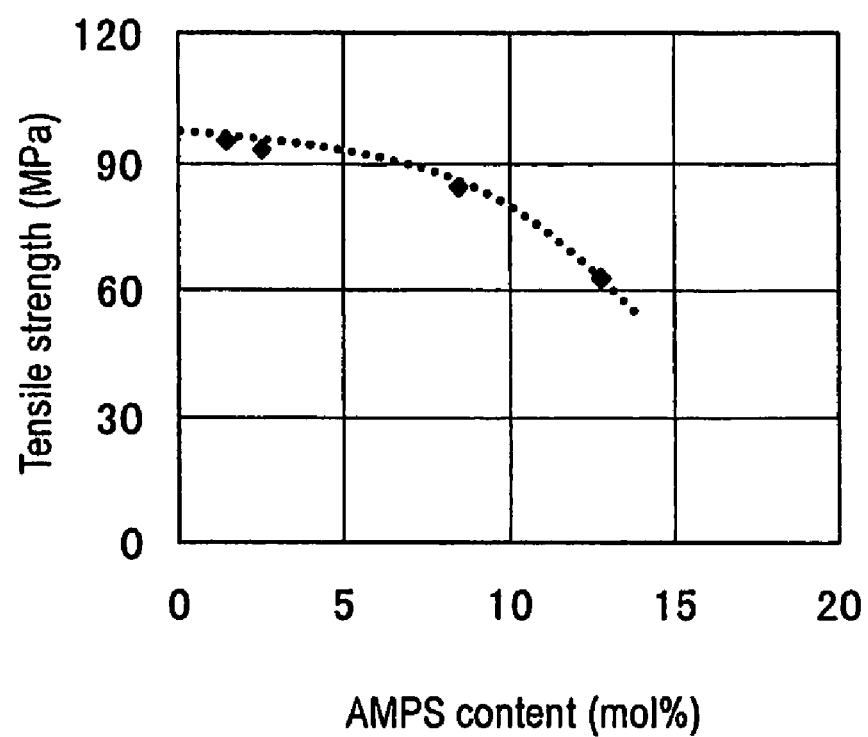
FIG. 8 is a graph showing the correlation between AMPS content and tensile strength.

FIG. 6 shows the proton conductivity in relation to the AMPS content obtained based on the results attained in Examples 8 to 11. Permeability was evaluated. FIG. 7 shows hydrogen permeability in relation to the AMPS content. FIG. 8 shows tensile strength in relation to the AMPS content.

As is apparent from the results shown in FIG. 6, AMPS contents of 1 mole percent or higher yielded satisfactory conductivity, and AMPS contents of 6 mole percent or higher yielded more satisfactory conductivity. As is apparent from the results shown in FIG. 7, hydrogen permeability was improved along with increase in the AMPS content; however, such improvement was insignificant, and the improvement in hydrogen permeability of Nafion 117 was quite small. As is apparent from the results shown in FIG. 8, tensile strength was significantly deteriorated when the AMPS content exceeded 10 mole percent.

Accordingly, proton conductivity, hydrogen permeability (methanol permeability), and tensile strength were found to be optimal when the AMPS content was between 6 mole percent and 10 mole percent.

Example 12

(1) Polyvinyl alcohol (PVA, 15 g) was dissolved in 225 ml of ion-exchanged water in a conical flask in an oil bath at 100° C.

(2) The mixture was cooled to room temperature, and 5 g of 2-acrylamido-2-methylpropane sulfonic acid (AMPS) monomer was added thereto.

(3) The flask was stoppered with a septum and nitrogen gas was bubbled for 1 hour.

(4) Diammonium cerium nitrate (CAN, 0.855 g) was added as a polymerization initiator, and polymerization was carried out at 40° C. for 1.5 hours together with agitation with a stirrer.

(5) The polymer was allowed to precipitate from a polymerization solution using methanol, followed by filtration and drying.

(6) The resulting polymer was dissolved in 350 ml of ion-exchanged water at 100° C., and the resulting solution was cast on an acrylic board and then dried at 50° C. to form a membrane.

(7) The composition of the graft polymer was analyzed via NMR, and the AMPS content was found to be 0.6 mole percent.

(8) The membrane was thermally treated at 160° C. for 20 minutes.

(9) The thermally treated membrane was immersed in a solution comprising 5 volume percent ion-exchanged water, 0.1 mol/l hydrochloric acid, and 0.01 volume percent glutaraldehyde (GA) in acetone, and the solution was stirred at room temperature using a stirrer for 24 hours.

(10) The membrane was immersed in ion-exchanged water (ion-exchanged water was replaced with fresh ion-exchanged water several times during immersion).

(11) The alternating current impedance was measured in pure water at room temperature to determine the proton conductivity.

Example 13

The procedures of Example 12 were repeated except for (2) and (7).

(2) The mixture was cooled to room temperature, and 10 g of 2-acrylamido-2-methylpropane sulfonic acid (AMPS) monomer was added thereto.

(7) The composition of the graft polymer was analyzed via NMR, and the AMPS content was found to be 1.0 mole percent.

Example 14

The procedures of Example 12 were repeated except for (2) and (7).

(2) The mixture was cooled to room temperature, and 15 g of 2-acrylamido-2-methylpropane sulfonic acid (AMPS) monomer was added thereto.

(7) The composition of the graft polymer was analyzed via NMR, and the AMPS content was found to be 1.4 mole percent.

Example 15

The procedures of Example 12 were repeated except for (2) and (7).

(2) The mixture was cooled to room temperature, and 20 g of 2-acrylamido-2-methylpropane sulfonic acid (AMPS) monomer was added thereto.

(7) The composition of the graft polymer was analyzed via NMR, and the AMPS content was found to be 1.6 mole percent.

Example 16

(1) to (8) of Example 12 were carried out in the same manner.

(9) The thermally treated membrane was immersed in an aqueous solution of 2 mol/l NaCl for 24 hours.

(10) Concentrated hydrochloric acid was added to the aqueous solution of 2 mol/l NaCl to bring the pH level to 1, the membrane was immersed in an aqueous solution containing glutaraldehyde (GA), and the solution was stirred at room temperature using a stirrer for 24 hours.

(11) The membrane was immersed in an aqueous solution of 1 mol/l HCl for 24 hours.

(12) The membrane was immersed in ion-exchanged water (ion-exchanged water was replaced with fresh ion-exchanged water several times during immersion).

(13) The alternating current impedance was measured in pure water at room temperature to determine the proton conductivity.

Example 17

(1) to (8) of Example 13 were carried out in the same manner.

(9) to (13) of Example 16 were carried out in the same manner.

Example 18

(1) to (8) of Example 14 were carried out in the same manner.

(9) to (13) of Example 16 were carried out in the same manner.

Example 19

(1) to (8) of Example 15 were carried out in the same manner.

(9) to (13) of Example 16 were carried out in the same manner.

Figure 9:
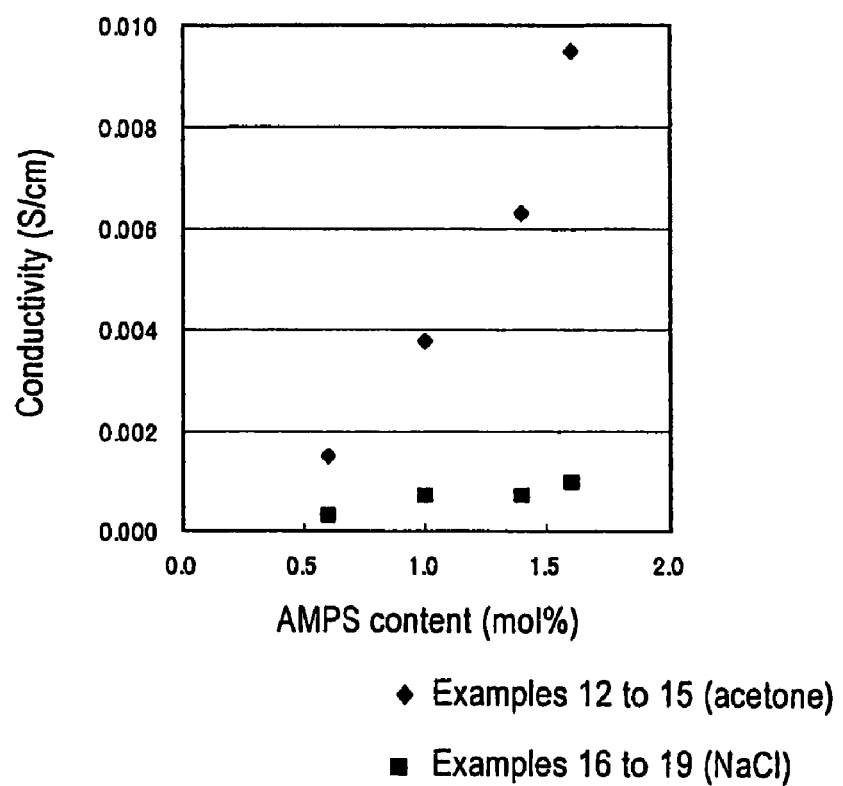
FIG. 9 is a graph showing the correlation between AMPS content and proton conductivity at the time of crosslinking using an acetone solution.

FIG. 9 shows the proton conductivity in relation to the AMPS content obtained based on the results attained in Examples 12 to 19. As is apparent from the results shown in FIG. 9, use of an aqueous solution of acetone in chemical crosslinking following polymerization and thermal treatment can yield excellent proton conductivity, mechanical strength, and degree of gas permeability regulation. This is deduced to result from an increase in the degree of membrane crystallization in acetone. Thus, optimal conditions for chemical crosslinking to obtain a novel polymer of the present invention were determined. More specifically, grafting between PVA and AMPS enables the maintenance of membrane performance. Further optimization of the composition and the crosslinking conditions can yield satisfactory proton conductivity, hydrogen permeability (methanol permeability), and mechanical strength. It should be noted that glutaraldehyde (GA) crosslinking using the polymer electrolyte (salt) according to Examples 16 to 19 is not impractical compared with glutaraldehyde (GA) crosslinking using the acetone solution according to Examples 12 to 15.

INDUSTRIAL APPLICABILITY

The graft polymer of the present invention that comprises a main chain comprising a hydroxyl group-containing polymer and a graft chain comprising a polymer containing a sulfonic acid group-containing monomer has excellent proton conductivity, can regulate hydrogen permeability, methanol permeability, and the like, and can serve as a starting material of a polymer electrolyte membrane, which facilitates moisture balance control and efficient operation of a fuel cell. Such starting material plays a key role in the dissemination of a fuel cell.

The polymer electrolyte membrane of the present invention can be extensively used for water electrolysis, halogen acid electrolysis, brine electrolysis, an oxygen concentrator, a humidity sensor, a gas sensor, or other applications in addition to a fuel cell.

The invention claimed is:

1. A crosslinked graft polymer comprising a main chain comprising polyvinyl alcohol (PVA) and a graft chain comprising a polymer containing a sulfonic acid group-containing monomer,
wherein the crosslinked graft polymer is obtained by a thermal treatment at 140° C. to 180° C., and
wherein the sulfonic acid group-containing monomer is selected from the group consisting of 2-acrylamido-2-methylpropane sulfonic acid, 2-(meth)acrylamido-2-methylpropane sulfonic acid, vinyl sulfonic acid, styrene sulfonic acid, α-methyl styrene sulfonic acid, 2-sulfoethyl methacrylate, and salts thereof.

2. The crosslinked graft polymer according to claim 1, wherein the sulfonic acid group-containing monomer is 2-acrylamido-2-methylpropane sulfonic acid, 2-(meth)acrylamido-2-methylpropane sulfonic acid, or salts thereof.

3. The crosslinked graft polymer according to claim 1, wherein the content of the sulfonic acid group-containing monomer is 1 to 90 mol % relative to the total amount of the graft polymer.

4. The crosslinked graft polymer according to claim 1, wherein the content of the sulfonic acid group-containing monomer is 6 to 20 mol % relative to the total amount of the graft polymer.

5. The crosslinked graft polymer according to claim 1, wherein the synthesized graft polymer is subjected to physical and/or chemical crosslinking.

6. The crosslinked graft polymer according to claim 5, wherein the physical crosslinking is carried out via thermal treatment.

7. The crosslinked graft polymer according to claim 5, wherein the chemical crosslinking is carried out with glutaraldehyde (GA).

8. A method for preparing a crosslinked graft polymer according to claim 1 comprising subjecting polyvinyl alcohol (PVA) to graft polymerization with a sulfonic acid group-containing monomer,
wherein the crosslinked graft polymer is obtained by a thermal treatment at 140° C. to 180° C., and
wherein the sulfonic acid group-containing monomer is selected from the group consisting of 2-acrylamido-2-methylpropane sulfonic acid, 2-(meth)acrylamido-2-methylpropane sulfonic acid, vinyl sulfonic acid, styrene sulfonic acid, α-methyl styrene sulfonic acid, 2-sulfoethyl methacrylate, and salts thereof.

9. The method for preparing the crosslinked graft polymer according to claim 8, wherein the sulfonic acid group-containing monomer is 2-acrylamido-2-methylpropane sulfonic acid, 2-(meth)acrylamido-2-methylpropane sulfonic acid, or salts thereof.

10. The method for preparing the crosslinked graft polymer according to claim 8, wherein a content of the sulfonic acid group-containing monomer is at least 2 mol % relative to the total amount of the graft polymer.

11. The method for preparing the crosslinked graft polymer according to claim 8, wherein diammonium cerium nitrate (CAN) is used as a polymerization initiator.

12. A polymer electrolyte membrane comprising the crosslinked graft polymer according to claim 1.

13. The polymer electrolyte membrane according to claim 12, which is formed by casting the crosslinked graft polymer.

14. The polymer electrolyte membrane according to claim 12, wherein the synthesized crosslinked graft polymer is subjected to physical and/or chemical crosslinking.

15. The polymer electrolyte membrane according to claim 14, wherein the physical crosslinking is carried out via thermal treatment.

16. The polymer electrolyte membrane according to claim 14, wherein the chemical crosslinking is carried out with glutaraldehyde (GA).

17. A method for preparing a polymer electrolyte membrane comprising a step of synthesizing the crosslinked graft polymers according to claim 8 and a step of casting the graft polymers.

18. The method for preparing the polymer electrolyte membrane according to claim 17, which further comprises a step of subjecting the crosslinked graft polymer to physical and/or chemical crosslinking.

19. The method for preparing the polymer electrolyte membrane according to claim 18, wherein physical crosslinking is carried out via thermal treatment.

20. The method for preparing the polymer electrolyte membrane according to claim 18, wherein the chemical crosslinking is carried out with glutaraldehyde (GA).

21. The method for preparing the polymer electrolyte membrane according to claim 17, wherein casting is carried out on a planar object.

22. The method for preparing the polymer electrolyte membrane according to claim 17, wherein casting is carried out by allowing the crosslinked graft polymer to impregnate porous polymer.

23. The method for preparing the polymer electrolyte membrane according to claim 17, which further comprises a step of insolubilizing the solution containing the crosslinked graft polymer with the use of an organic solvent.

24. The method for preparing the polymer electrolyte membrane according to claim 23, wherein the organic solvent is acetone.

25. The method for preparing the polymer electrolyte membrane according to claim 17, which further comprises a step of insolubilizing the solution containing the crosslinked graft polymer with the use of a salt.

26. A polymer electrolyte fuel cell comprising the polymer electrolyte membrane according to claim 12.

* * * * *